US009075544B2

(12) United States Patent
Boden et al.

(10) Patent No.: US 9,075,544 B2
(45) Date of Patent: Jul. 7, 2015

(54) INTEGRATION AND USER STORY GENERATION AND REQUIREMENTS MANAGEMENT (71) Applicant: International Business Machines Corporation, Armonk, NY (US)

(72) Inventors: Edward B. Boden, Highland, NY (US); Robert C. Hansen, Endicott, NY (US); Anthony F. Pioli, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 13/741,790

(22) Filed: Jan. 15, 2013

(65) Prior Publication Data
US 2014/0201704 A1 Jul. 17, 2014

(51) Int. Cl.
*G06Q 30/00* (2012.01)
*G06F 7/00* (2006.01)
*G06F 17/00* (2006.01)
*G06F 3/00* (2006.01)
*G06F 9/44* (2006.01)
*G06F 9/45* (2006.01)

(52) U.S. Cl.
CPC ........................................ *G06F 8/10* (2013.01)

(58) Field of Classification Search
CPC ............... G06F 8/10; G06F 8/30; G06F 8/65; G06F 9/44; G06F 8/60; G06F 8/61; G06F 8/70; G06F 11/3672; G06F 11/3676; G06F 11/3684; G06F 11/3688; G06F 11/3692; G06Q 10/025; G06Q 10/067; G06Q 20/20
See application file for complete search history.

(56) References Cited

U.S. PATENT DOCUMENTS

| 5,617,568 | A  | 4/1997  | Ault et al. |
| 6,342,907 | B1 | 1/2002  | Petty et al. |
| 6,367,077 | B1 | 4/2002  | Brodersen et al. |
| 6,536,036 | B1 | 3/2003  | Pavela |
| 6,799,718 | B2 | 10/2004 | Chan et al. |
| 6,910,041 | B2 | 6/2005  | Exton et al. |

(Continued)

FOREIGN PATENT DOCUMENTS

| CA | 2680978 A1   | 4/2010  |
| CN | 101833507 B  | 12/2011 |

(Continued)

OTHER PUBLICATIONS

Achim D. Brucker et al., "HOL-TestGen An Interactive Test-case Generation Framework,"; M. Chechik and M. Wirsing (Eds.): FASE 2009, LNCS 5503, pp. 417-420, 2009.

(Continued)

*Primary Examiner* — Don Wong
*Assistant Examiner* — Anibal Rivera
(74) *Attorney, Agent, or Firm* — Cantor Colburn LLP; William A. Kinnaman, Jr.

(57) ABSTRACT

A computer-implemented method for managing user story requirements includes collecting, by a processor, a plurality of requirements, creating, by the processor, a plurality of content space specification files that includes the plurality of requirements, processing, by the processor, the plurality of content space specification files to generate a plurality of content space-based testable units, and managing, by the processor, the plurality of requirements to reduce gaps and overlap between individual content space testable units in the plurality of content space-based testable units.

11 Claims, 5 Drawing Sheets

(56) References Cited

U.S. PATENT DOCUMENTS

| | | |
|---|---|---|
| 7,000,184 B2 | 2/2006 | Matveyenko et al. |
| 7,127,707 B1 | 10/2006 | Mishra et al. |
| 7,139,737 B2 | 11/2006 | Takahashi et al. |
| 7,149,699 B2 | 12/2006 | Barnard et al. |
| 7,210,066 B2 | 4/2007 | Mandava et al. |
| 7,272,752 B2 | 9/2007 | Farchi et al. |
| 7,467,198 B2 | 12/2008 | Goodman et al. |
| 7,467,202 B2 | 12/2008 | Savchuk |
| 7,503,037 B2 | 3/2009 | Banerjee et al. |
| 7,509,626 B1 | 3/2009 | Barnes et al. |
| 7,512,957 B2 | 3/2009 | Cohen et al. |
| 7,530,057 B2 | 5/2009 | Babcock |
| 7,555,742 B2 | 6/2009 | Iborra et al. |
| 7,562,338 B2* | 7/2009 | Knutson et al. ............... 717/101 |
| 7,581,205 B1 | 8/2009 | Massoudi |
| 7,587,636 B2 | 9/2009 | Tillmann et al. |
| 7,752,606 B2 | 7/2010 | Savage |
| 7,761,591 B2 | 7/2010 | Graham |
| 7,778,899 B2 | 8/2010 | Scumniotales et al. |
| 7,861,178 B2 | 12/2010 | Lui et al. |
| 7,904,890 B1 | 3/2011 | Hsieh et al. |
| 7,979,796 B2 | 7/2011 | Williams et al. |
| 8,006,222 B2 | 8/2011 | Ruhe |
| 8,032,860 B2 | 10/2011 | Piehler et al. |
| 8,037,453 B1 | 10/2011 | Zawadzki |
| 8,069,435 B1 | 11/2011 | Lai |
| 8,104,018 B2 | 1/2012 | Chessell et al. |
| 8,112,814 B2 | 2/2012 | Shimizu |
| 8,347,263 B1 | 1/2013 | Offer |
| 8,407,669 B2 | 3/2013 | Yee et al. |
| 8,429,708 B1 | 4/2013 | Tandon |
| 8,458,646 B2 | 6/2013 | Knutson et al. |
| 8,566,779 B2* | 10/2013 | Sukhenko et al. ............ 717/103 |
| 8,577,937 B1 | 11/2013 | Offer |
| 8,645,341 B2* | 2/2014 | Salman et al. ............... 707/695 |
| 8,645,907 B2 | 2/2014 | Jain et al. |
| 8,701,078 B1 | 4/2014 | Holler et al. |
| 8,707,248 B2* | 4/2014 | Sawant et al. ................ 717/104 |
| 8,875,088 B1 | 10/2014 | Holler et al. |
| 2001/0013024 A1 | 8/2001 | Takahashi et al. |
| 2002/0016953 A1 | 2/2002 | Sollich |
| 2002/0111808 A1* | 8/2002 | Feinberg .................... 704/270.1 |
| 2002/0149614 A1 | 10/2002 | Biebesheimer et al. |
| 2002/0165912 A1 | 11/2002 | Wenocur et al. |
| 2002/0178360 A1 | 11/2002 | Wenocur et al. |
| 2002/0194483 A1 | 12/2002 | Wenocur et al. |
| 2002/0194501 A1 | 12/2002 | Wenocur et al. |
| 2002/0199001 A1 | 12/2002 | Wenocur et al. |
| 2002/0199096 A1 | 12/2002 | Wenocur et al. |
| 2003/0009694 A1 | 1/2003 | Wenocur et al. |
| 2003/0041110 A1 | 2/2003 | Wenocur et al. |
| 2003/0056173 A1 | 3/2003 | Copenhaver et al. |
| 2003/0093716 A1 | 5/2003 | Farchi et al. |
| 2003/0121011 A1 | 6/2003 | Carter |
| 2004/0025166 A1 | 2/2004 | Adlung et al. |
| 2004/0143811 A1 | 7/2004 | Kaelicke et al. |
| 2004/0204970 A1 | 10/2004 | Boden et al. |
| 2005/0039045 A1 | 2/2005 | Wheeler |
| 2005/0044197 A1 | 2/2005 | Lai |
| 2005/0055399 A1 | 3/2005 | Savchuk |
| 2005/0114331 A1 | 5/2005 | Wang et al. |
| 2005/0114771 A1 | 5/2005 | Piehler et al. |
| 2005/0114830 A1* | 5/2005 | Knutson et al. ............... 717/102 |
| 2005/0144529 A1 | 6/2005 | Gotz et al. |
| 2005/0160405 A1 | 7/2005 | Lunia et al. |
| 2006/0036935 A1 | 2/2006 | Warner et al. |
| 2006/0150200 A1 | 7/2006 | Cohen et al. |
| 2006/0230410 A1 | 10/2006 | Kurganov et al. |
| 2006/0287959 A1 | 12/2006 | Blecken |
| 2007/0005300 A1 | 1/2007 | Haggerty et al. |
| 2007/0006160 A1 | 1/2007 | Kunz et al. |
| 2007/0156693 A1 | 7/2007 | Soin et al. |
| 2007/0168918 A1 | 7/2007 | Metherall et al. |
| 2007/0250815 A1 | 10/2007 | Bendapudi et al. |
| 2008/0027742 A1 | 1/2008 | Maeda |
| 2008/0066071 A1 | 3/2008 | Jain et al. |
| 2008/0102422 A1 | 5/2008 | Hayes et al. |
| 2008/0120602 A1 | 5/2008 | Comstock et al. |
| 2008/0148253 A1 | 6/2008 | Badwe et al. |
| 2008/0229278 A1 | 9/2008 | Liu et al. |
| 2008/0244557 A1 | 10/2008 | Yeung et al. |
| 2008/0263505 A1 | 10/2008 | St. Clair et al. |
| 2008/0270981 A1 | 10/2008 | Hutchison et al. |
| 2009/0031286 A1 | 1/2009 | Yee et al. |
| 2009/0037912 A1 | 2/2009 | Stoitsev et al. |
| 2009/0119779 A1 | 5/2009 | Dean et al. |
| 2009/0259985 A1 | 10/2009 | Knutson et al. |
| 2009/0271319 A1 | 10/2009 | Bromley et al. |
| 2009/0271760 A1 | 10/2009 | Ellinger |
| 2010/0169862 A1 | 7/2010 | Wolf et al. |
| 2010/0180258 A1 | 7/2010 | Takahashi |
| 2010/0228683 A1 | 9/2010 | Ansley et al. |
| 2010/0251379 A1 | 9/2010 | Myers et al. |
| 2010/0269095 A1 | 10/2010 | King et al. |
| 2010/0313179 A1 | 12/2010 | Groves et al. |
| 2011/0066420 A1 | 3/2011 | Bassin et al. |
| 2011/0088014 A1 | 4/2011 | Becker et al. |
| 2011/0131134 A1 | 6/2011 | Ferris et al. |
| 2011/0131315 A1 | 6/2011 | Ferris et al. |
| 2011/0138358 A1 | 6/2011 | Rau et al. |
| 2011/0154378 A1 | 6/2011 | Kishan et al. |
| 2011/0239227 A1 | 9/2011 | Schaefer et al. |
| 2011/0246540 A1* | 10/2011 | Salman et al. ................ 707/812 |
| 2011/0264649 A1 | 10/2011 | Hsiao et al. |
| 2011/0295701 A1 | 12/2011 | Phan |
| 2012/0005209 A1 | 1/2012 | Rinearson et al. |
| 2012/0005692 A1 | 1/2012 | Bulko et al. |
| 2012/0011455 A1 | 1/2012 | Subramanian et al. |
| 2012/0054250 A1 | 3/2012 | Williams et al. |
| 2012/0158527 A1 | 6/2012 | Cannelongo et al. |
| 2012/0158669 A1 | 6/2012 | Morsi et al. |
| 2012/0159441 A1* | 6/2012 | Ghaisas ........................ 717/123 |
| 2012/0174194 A1 | 7/2012 | Furukawa |
| 2012/0210243 A1 | 8/2012 | Uhma et al. |
| 2012/0246609 A1* | 9/2012 | Boden et al. .................. 717/101 |
| 2012/0246611 A1* | 9/2012 | Sawant et al. ................ 717/104 |
| 2012/0291010 A1 | 11/2012 | Hutchison et al. |
| 2012/0304248 A1 | 11/2012 | Watts et al. |
| 2012/0311003 A1 | 12/2012 | Kuznetsov et al. |
| 2013/0024847 A1 | 1/2013 | Browne et al. |
| 2013/0061200 A1* | 3/2013 | Roberts et al. ............... 717/100 |
| 2013/0216205 A1 | 8/2013 | Suri et al. |
| 2013/0326637 A1 | 12/2013 | Fang et al. |
| 2014/0013440 A1 | 1/2014 | Thakur et al. |
| 2014/0053127 A1* | 2/2014 | Madison et al. .............. 717/103 |
| 2014/0123107 A1 | 5/2014 | Rajagopalan |
| 2014/0201704 A1 | 7/2014 | Boden et al. |
| 2015/0020053 A1 | 1/2015 | Boden et al. |

FOREIGN PATENT DOCUMENTS

| | | |
|---|---|---|
| JP | 2006195529 A | 7/2006 |
| KR | 823227 B1 | 4/2008 |
| WO | 2011031328 A2 | 3/2011 |

OTHER PUBLICATIONS

L. Chung et al., "On Non-Functional Requirements in Software Engineering," Lecture Notes in Computer Science, v.5600, pp. 363-379, 2009.

IBM, "Method and System for Dynamically Unloading and Loading Software Applications from a Peer-to-Peer Platform", IP.com IPCOM000193302D, Feb. 18, 2010, pp. 1-3.

Anonymous, "Standardization for the Configuration of Heterogeneous Platforms Through Schema-Based Platform Tag Definitions", IP.com IPCOM000020720D, Dec. 10, 2003, pp. 1-5.

Huaikou Miao et al., "An Approach to Generating Test Cases for Testing Component-based Web Applications,"; Workshop on Intelligent Information Technology Application, Dec. 2-3, 2007, p. 264-269.

Yara, P, et al. "Global Software Development with Cloud Platforms", Gotel, O. et al. (eds): Seafood 2009, LNBIP 35, pp. 81-95, 2009.

(56) References Cited

OTHER PUBLICATIONS

Wei Yu, "Refactoring Use Case Models on Episodes," Thesis, Dept. of Computer Science, Concordia Univ., Montreal, Quebec, Mar. 2004.

International Search Report and Written Opinion; International Application No. PCT/IB2014/058076; International filing date Jan. 6, 2014; Date of mailing Apr. 21, 2014; 10 pages.

Leffingwell, "A Ralley Software Development Corporation Whitepaper—Agile Software Development with Verification and Validation in . . . "; 2011, [retrieved Feb. 3, 2015]; retrieved fm internet <URL:http://www.ultertechnologies.com/docs/agile.pdf> 33 pgs.

European Examination Report for Application No. EP10776347.6—1957, dated Oct. 3, 2014, 6 pgs.

* cited by examiner

INTEGRATION AND USER STORY GENERATION AND REQUIREMENTS MANAGEMENT

BACKGROUND

The present invention relates to user stories and requirements in software development, and more specifically, to systems and methods for integration and user story generation and requirements management.

In software engineering and system development work, user stories and use cases are techniques to assist in the understanding and analysis of software product requirements, to organize work for a software development project, and to help communicate and validate requirements understanding by reviewing with stake-holders. Use cases are treated expressions of requirements. Use cases have been around longer than user stories and are well-established in software development. For example, Unified Modeling Language (UML) tools all include the ability to diagram use cases. User stories are newer and have arisen out of the development approaches termed "Agile". Agile stories are in part a reaction to use cases which have been perceived as time-consuming and too procedurally heavy-weight. User stories are a quick way of handling customer requirements without having to create formalized requirement documents and without performing administrative tasks related to maintaining them. The intention of the user story is to be able to respond faster and with less overhead to rapidly changing real-world requirements.

Despite their widespread use, use cases and user stories have well-known problems. Use cases, for example have long been known to overlap, and the overlap is often accepted as a normal inherent condition with use cases. Another well-known problem with use cases is that there can be gaps between use cases (or user stories). Gap analysis is implemented to determine gaps and manage gaps. In addition, another problem with use cases (and user stories) is the there are often too many of them. The number and/or the length of use cases are commonly due to trying to capture too much detail. In contrast, too little detail is also a problem and leads to gaps, overlaps, and inability to define successful tests due to overly vague specification. Conventional use case products allow for creation of use cases that can be associated with a requirement, but often the list is informal with no logically necessary connection to the requirement or the product. Use case products also typically lack a notion of completeness (i.e., the number of use cases included in a complete list), and lack means to determine gaps or overlaps. As such, UML products are flexible, but typically have no integrity checking on use case models, thereby making it easy to produce fragmentary, incomplete, inconsistent, ambiguous specifications while still following all of the UML's requirements.

SUMMARY

Exemplary embodiments include a computer-implemented method for managing user story requirements, the method including collecting, by a processor, a plurality of requirements, creating, by the processor, a plurality of content space specification files that includes the plurality of requirements, processing, by the processor, the plurality of content space specification files to generate a plurality of content space-based testable units (i.e., user stories), and managing, by the processor, the plurality of requirements to reduce gaps and overlap between individual content space testable units in the plurality of content space-based testable units.

Additional exemplary embodiments include a computer program product for managing user story requirements, the computer program product including a non-transitory computer readable medium storing instructions for causing a computer to implement a method. The method includes collecting, by a processor, a plurality of requirements, creating, by the processor, a plurality of content space specification files that includes the plurality of requirements, processing, by the processor, the plurality of content space specification files to generate a plurality of content space-based testable units, and, managing, by the processor, the plurality of requirements to reduce gaps and overlap between individual content space testable units in the plurality of content space-based testable units.

Additional exemplary embodiments include a system for managing user story requirements, the system including a processor configured to collect a plurality of requirements, create a plurality of content space specification files that includes the plurality of requirements, process the plurality of content space specification files to generate the a plurality of content space-based testable units, and manage the plurality of requirements to reduce gaps and overlap between individual content space testable units in the plurality of content space-based testable units.

Further exemplary embodiments include a computer-implemented method for managing user story requirements, the method including collecting a plurality of requirements, defining a content space including a plurality of cells, each cell defining a content space-based testable unit, each cell having a plurality of dimensions, creating a plurality of content space specification files that includes the plurality of requirements, traversing at least one dimension of each of the plurality of cells to generate the content space-based testable unit, and managing the plurality of requirements to reduce gaps and overlap between individual content space testable units among a plurality of content space-based testable units.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, the systems and methods described herein implement content space-based units to address many of the problems associated with traditional use cases and user stories. The testable units come in a range of resolutions that correspond to use cases at the low end and user stories at the higher resolutions. The systems and methods described herein reduce gaps and overlaps in use cases and user stories, determine if the use cases or user stories are complete given a set of requirements, determine if there are too many use cases or user stories, bridge use cases and user stories from requirements to software implementation and test, and provide automation. In addition, the systems and methods described herein are implemented in the context of existing requirements management tools. As such, the systems and methods described herein enhance the relationship between requirements and use cases and user stories by adding discipline via a systematic analysis that directly ties requirements to the resulting testable units. The direct relationships between requirements and testable units are implemented to solve the main problems described herein completeness, overlap, and gaps while adding automated requirements traceability, by implementing a content space. A general relationship is defined across a range of testable units giving a broader range of outside-in, testable entities. This spectrum also serves to address the general problems of varying levels of detail.

In exemplary embodiments, content space-based testable units serve as a framework or skeleton for the development of traditional use cases for a project. The testable units also serve as the framework for user stories if user stories are implemented. Content space-based testable units can replace the need for user stories. Hence these testable units are often simply referred to as user stories herein. Upon completion of the content space analysis of the requirements, the systems and methods described herein implement the content space to output generated testable units, and use these to prime the project plans or agile backlog (e.g. Rational Team Composer (RTC)). The systems and methods described herein also address well-known challenges with respect to requirements: traceability of requirements, estimating requirements development costs, evaluation of requirements feasibility, and change management. Improvements for all these are realized by the down stream use of the generated testable units in implementation phases.

It will be appreciated that there are a number of ways such integration might be accomplished, and different aspects of integration to be considered. The systems and methods described herein focus on the functional points of integration, although other points are contemplated in other exemplary embodiments. The points of integration of user story generation with requirements management include but are not limited to: 1. Content Space analysis of requirements, which builds content space definition using requirements for a new release; 2. Navigation, Generation and Review of Content Space per requirement, which provides clarity and cross-team visibility to requirements and builds a common understanding, and content space export; 3. Content space import (of prior release) and export of the total release Content Space, which ensures continuity with past releases, create a basis for the next release, and directly bridge to support the implementation phases for this release; 4. Navigation, review and edit of the content space (total view); and 5. Content space statistics, including by requirement.

As described herein, a content space model is implemented for user story integration and generation. A content space is a way of representing software content from an outside-in perspective via a set of dimensions. Each of the content space dimensions has values defined in terms of the software itself that concern a particular aspect, such as information abstraction, function, external interface and run-time environment. The dimension values can represent existing content and also new content for the software, based on requirements (via content space analysis) for a new release. The content space can be programmatically traversed, and as this traversal occurs, end-to-end testable units (termed user stories) are output, each corresponding to a particular region of the content space and having content space coordinates. The set of all output user stories partitions the software content and the set of all new and changed user stories partitions the release requirements. The set of all user stories and various subsets (e.g., all Power user stories) are used to compute the content coverage metric of various scopes.

An example of how a content space can be set up and implemented is now discussed. It will be appreciated that the following example is illustrative of a content space and not limiting.

In exemplary embodiments, the content space can be a five-dimensional space (termed either as a 'software product content space' or a 'content space'), such that each cell within the content space is an end-to-end use case (i.e., agile user story). In exemplary embodiments, the systems and methods described herein can be implemented for software with various levels of scale, from individual software components to very large products comprising hundreds of components to define the user stories and use cases. The five dimensions structure the work as needed by software development (i.e., design, test, project management), and the requirements serve to define the values used on the dimensions. As such, the exemplary content space servers to bridge the requirements domain and implementation domain.

Figure 1:
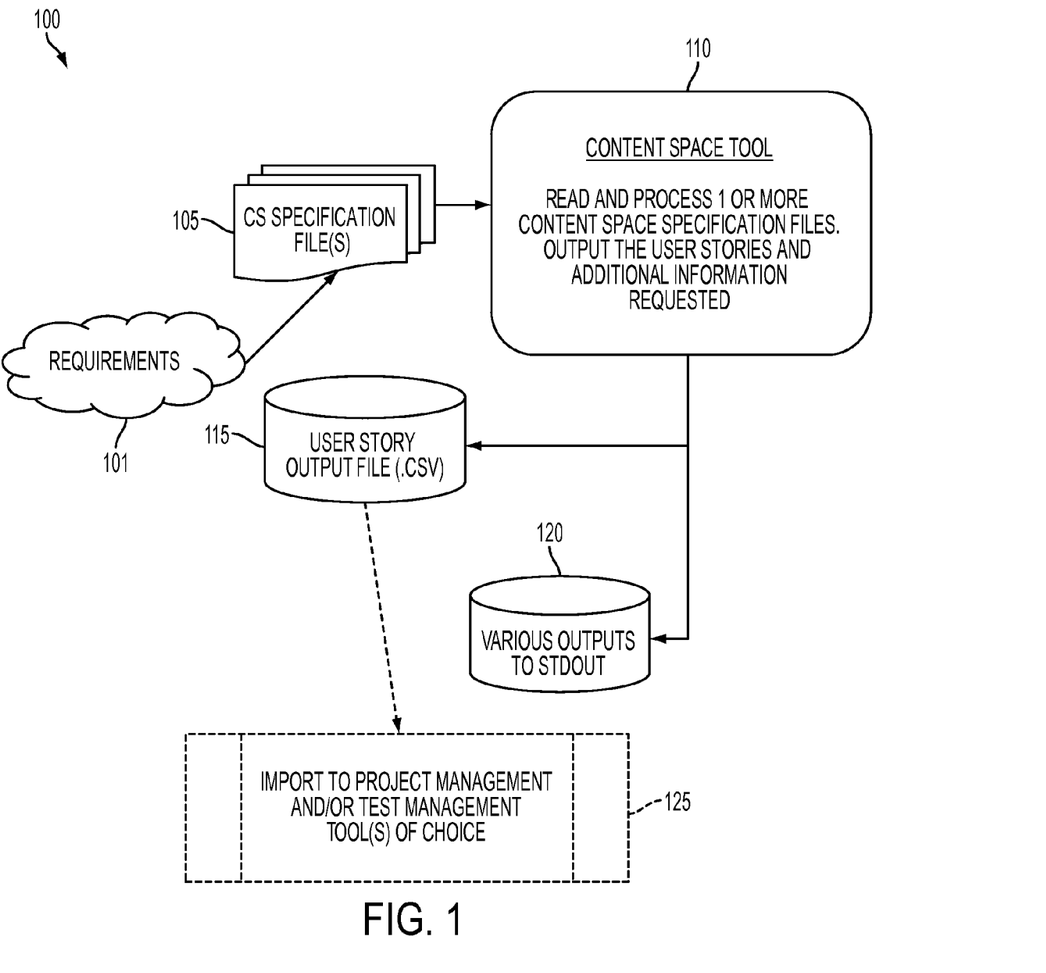
FIG. 1 illustrates a high level block diagram of a system for generating agile user stories and managing requirements.

FIG. 1 illustrates a high level block diagram of a system 100 for generating agile user stories and managing requirements. The system 100 outlines and overviews the exemplary methods, the blocks for which are described further herein. It will be appreciated that each of the summary details described herein includes multiple users from each of the two domains, with multiple reviews. The order in which the individual steps are executed is not necessarily serial. Changes in requirements or additional insights happen during a later step can necessitate reworking the results from an earlier step.

In exemplary embodiments, content space specification files 105 are generated from the various sources in the requirements domain as described herein. As described further herein, the content space specification files are generated from various requirements 101. A content space tool 110 receives the content specification files 105 to automatically generate the agile user stories that can be stored in a user story storage medium 115. An additional storage medium 120 can be implemented to store changes to the specification files 105, or any other suitable output during the content space generation. Once generated, the agile user stories can be output to any suitable project management or test management tool 125 implemented by the users in the development domain.

The system 100 includes several functions, including, but not limited to: 1) articulating the content space; 2) classifying regions of the content space; 3) grouping the regions of the content space; 4) assigning priorities to use cases; and 5) loading the project management tool 125.

In articulating the content space, requirements are analyzed in terms of the five content space dimensions. This analysis results in (with iteration and consensus building) a definition of values for each of the five dimensions, which is represented in a form that can be programmatically processed. In articulating the content space, the systems and methods described herein address whether all the requirements are represented in the content space, whether each content space dimension value is properly defined and agreed upon, and whether all the dimension values are related to explicit, implicit or future requirements.

In classifying the regions of the content space, once the team is satisfied that the content space is defined (i.e., all dimension values known, understood, and reasonably well-defined) and that it does encompass all the requirements for a selected time-frame, the team next decides on how to classify regions of the content space. Through automated systems with team decisions, every cell in the content space is categorized (classified) in a variety of types, including, but not limited to: 1) does not apply to the product; 2) does apply to the product but for some future release; 3) is part of the product today (or from some prior release) and has no enhancements or changes; 4) is part of the product today and is enhanced or changed in some way; and 5) is a new or an enhanced function. The systems and methods described herein determine whether each content space dimension value is classified, and reviews of the results determine correctness.

Following agreement on the content space and categorization of regions, the content space regions are then grouped. Subsets of the content space are grouped together into a size which is desirable for project management and the scale of the product and teams. This step applies particularly to the content space regions classified as unchanged and new or enhanced (changed). The two extremes are; an entire content space can grouped into a single output project management work item, or at the other extreme every single content space cell can be output as a single project management line item. Essentially every possible grouping in between these extremes is also supported. Typically used are grouping all new & changed user stories for a particular platform or grouping specific sub-variations of a verb.

In exemplary embodiments, there is flexibility in how these regions are selected and how they related to the content space cell classifications. The systems and methods described herein determine whether the grouping is correct and do the groupings properly reflect the tradeoff between project management needs and technical visibility based on classifications and complexity.

The grouping of content space cells into right sized project management work items mostly focused on a new function and an existing and unchanged function. The user (team) can programmatically select the grouping of content space cells based on many considerations such overall content space size, product size, degree of technical difficulty of new function, team size, number of team, and the like. In exemplary embodiments, individual content cells are use cases (with adjustable granularity) and the groupings are user functions or user stories.

Based on the relative priorities of requirements, regions of the content space (subsets of use cases) are assigned priority values. These can be used to help focus review sessions to ensure the right higher priority content is defined. When loaded into a project management application, the priorities can be used directly by development in agile sprint (iteration) planning. The output project management work items are input (e.g., 'import') for example, from the user story storage medium 115, into an appropriate project management tool 125.

As described herein, a content space can be defined by five dimensions. In exemplary embodiments, the five dimensions of the content space are, in order: release (time); noun; verb; interface; and platform. The three dimensions, verb, interface and platform, are orthogonal and noun-specific. That is, an instance of these (e.g., a verb set, an interface set and a platform set) is defined for each noun of interest. Nouns are the fourth dimension. The combination of a noun and its associated 3D space is termed a 'noun space'. A set of noun spaces at a given point in time (usually associated with product release) constitute the definition of the content space for a particular release of a product (when the point in time is chosen on a release calendar boundary). Instances a product content space for multiple releases represent the fifth dimension of content space: time.

For illustrative purposes, an example of a software product, a hypothetical browser-based email client is discussed for ease of discussion. It will be appreciated that other products are contemplated for which user stories can be defined.

Figure 2:
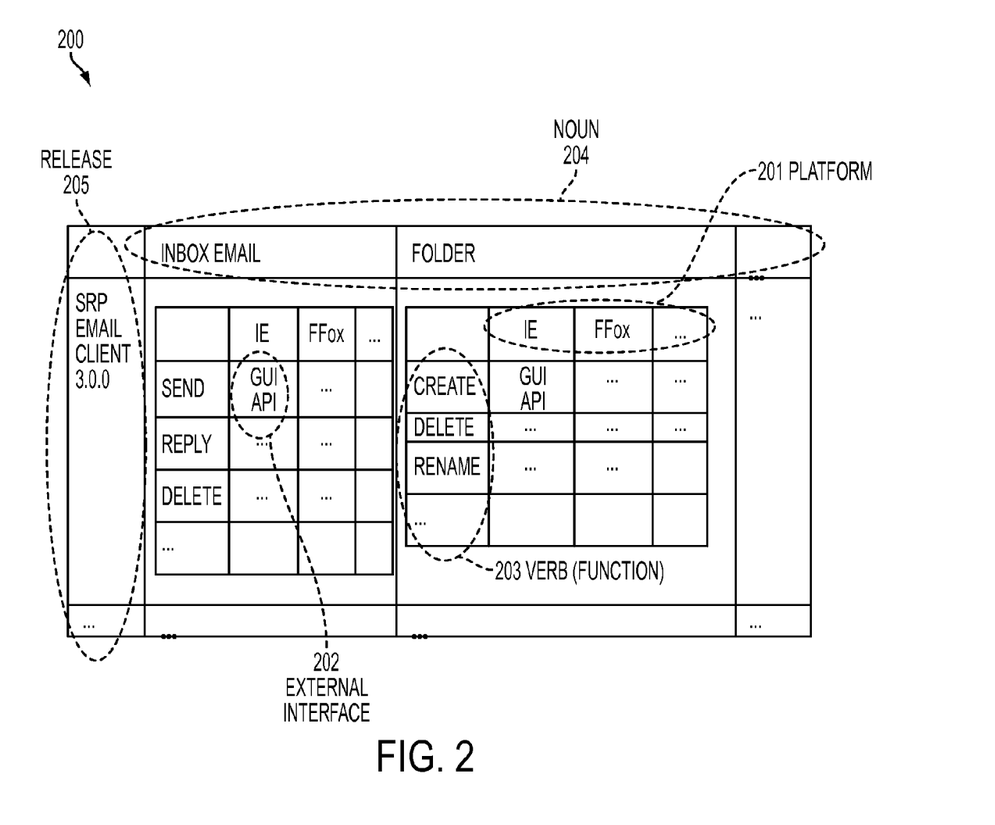
FIG. 2 illustrates a chart representation of the five exemplary dimensions described herein.

FIG. 2 illustrates a chart 200 representation of the five exemplary dimensions described herein. As described herein, the five dimensions of the content space are, from inner three to out-most: platform 201; interface 202; verb 203; noun 204; and release (time) 205. All of the values for the dimensions are derived from the product requirements, either explicit or implicit.

The platform dimension 201 is interpreted broadly to include the hardware, operating system, middle ware, hypervisor, and language runtime in which the product executes and other relevant attributes. Generally, meaningful platform elements are determined by each product. As such, the entire prerequisite software stack and hardware is considered. Values of the platform dimension 201 can include specific releases of each of these platform components as needed, or can be more generally specified. For example, a platform might be AIX 5.2 or just AIX. Alternatively, the platform might be Firefox 3.6 or better, or just Firefox. Values can include as needed ancillary hardware for storage, networking, hardware management controllers, firmware, etc. for the full functional system configuration.

The interface dimension 202 has values chosen to identify and separate the kinds of interfaces that the subject software presents to external entities; people, other software or hardware. The values can be specified by type such as Graphical User Interface (GUI), command line interface (CLI), and so on. The values can include programmable interfaces such as web services (e.g. REST) and APIs. Protocols can also be specified as values (e.g. IPv6 or MPI (Message Processing Interface) used in super-computing environments).

The verb dimension 203 includes values such as functions or operations that are supported by the subject software for a particular noun. The operations may be specified at varying levels of granularity, depending upon the needs of a given set of requirements. For example 'copy' or 'create' might be sufficient. More fine-grained values such 'copy to like repository' and 'copy to new folder' can also be used. The decision depends on considerations like how new the function is, or how critical the different forms of copy are to the product stake-holders (those that define requirements), or how technically difficult to implement.

The noun dimension 204 is an abstract entity presented to external entities via the interface(s). Most software for direct use by people has a number of such abstractions that people manipulate via the functions (verbs) presented by the software. Example nouns for an email client can include but are not limited to: inbox; inbox email; folder; and draft email. As with values on the above dimensions, there is flexibility in how coarse-grained or fine-grained the nouns are defined. The right level of noun dimension granularity for a given product and given release depends on the requirements.

The time dimension 205 values include natural values (i.e., discrete units) which are the releases planned for the product. The content space for release n+1 can be various additions and changes relative to the release n content space. These additions, enhancements and other changes affect the release n content space by changing the values defined on the various dimensions. New nouns, new verbs, new platforms, can all be added. Enhancements to exiting nouns and verbs are common are defined explicitly in the n+1 content space.

Because of the way the dimensions are defined, each generated user story is an end-to-end testable unit of function (sometimes termed 'FVT-able', where FVT=Function Verification Test). For example, for an "email" client each user story is a cell in the five-dimensional space with coordinates of release, noun, verb, interface and platform. For example, "send an email on Firefox via GUI release n" is represented by a 5-tuple {release n, email, send, GUI, Firefox}, as shown in FIG. 2.

Figure 3:
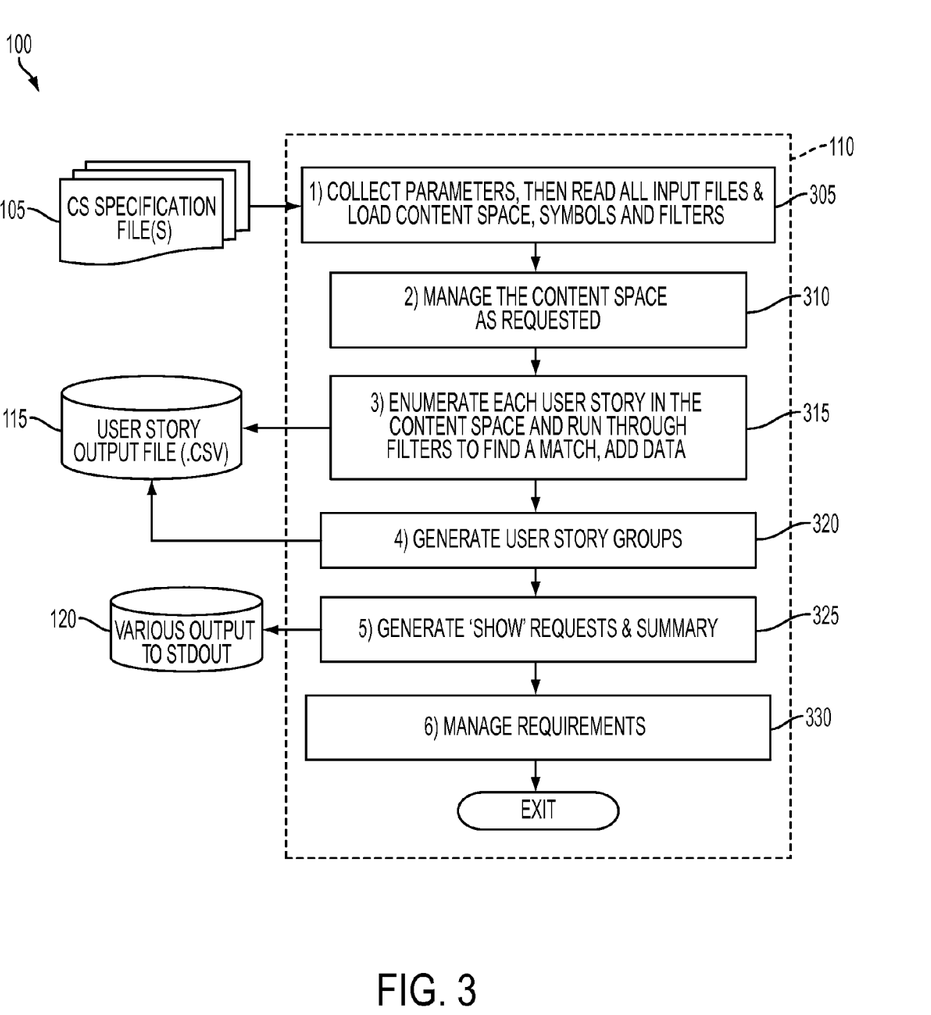
FIG. 3 illustrates the system for generating user stories based on a content space in software of FIG. 1, further illustrating the content space tool process flow that manages requirements.

FIG. 3 illustrates the system 100 for defining user story and use case generation based on a content space in software of FIG. 1, further illustrating the content space tool 110 process flow 300 that defines and manages the requirements of the use cases and user story generation. It will be appreciated that in the examples described herein, an existing product is to be beginning a new release with newly gathered and still incoming requirements. As such, the different blocks described herein may be performed in differing orders.

In exemplary embodiments, parameters are collected from the content space specification files 105 at block 305. In addition, any input files and content space symbols and filters are also read into the content space tool 110. As such, following invocation and initialization of the content space tool 110, the content space specification file(s) 105 are read. In addition, the content space specification files 105 are parsed for correctness and various checks are run to help ensure consistency across the possibly multiple files. This processing includes all the symbols and filters. At block 310, the content space is managed. In exemplary embodiments, grouping and folding are techniques to manage content space size. The size of a content space is naturally expressed as the number of user stories it contains, or will output if requested. For example, in software products, content space sizes in range of hundreds to tens of thousands (many of which may be 'future'). Average sizes can be in the range of two thousand to twenty thousand. Both folding and grouping can manage content space size without eliminating detail from the content space specification files 105.

In grouping user stories, a set of user stories is represented in output as a single user story. For example all the user stories for platform ABC or for function XYZ might be represented by a single output user story. Grouping does not change the size of a content space. Grouping allows the number of output user stories to be directly managed without eliminating any details from the CS specification. There is no limit on the size of a user story group. In exemplary embodiments, grouping is controlled by the user by filters in the content space specification file 105.

As filtering occurs, when a filter matches a user story and the filter has any kind of grouping requested, save the user story is saved in a buffer associated with the filter. After all filtering and all non-grouped user stories are output. The content space tool 110 loops through all the filters that have any kind of grouping. For each filter, the content space tool performs several steps. First, if a simple 'group' is requested in the filter, the content space tool 110 generates the single grouping user story, summary field, description field, and the like, and writes to output. The content space tool 110 then continues to the next filter. If a type of 'group by' is requested, then for each group by element (e.g. noun, verb, ifc, platform), the content space tool 110 builds subsets of the respective values on the dimension from among the buffered user stories. The content space tool 110 then generates a single user story group for each cross-dimension subset, generates the description field that itemizes the subset of user stories for the group, and writes the user story group.

Folding also reduces the number of output user stories like grouping. But in contrast to grouping, folding reduces the size of the content space. Folding reduces the size of the content space by collecting some number of dimension element values into a single value. The resulting single value is then used as a dimension element value in place of the multiple collected values, thereby reducing the size of the content space. The single resulting value is termed a folding symbol ('fold sym').

As described herein, folding does not eliminate the details from the content space specification file. The values collected into a fold sym remain in the content space specification file 105, and the folding done by the fold sym can be toggled on or off. The value-folding can be switched on and off for each of the noun, verb, interface and platform dimensions independently or all four dimensions together. Hence not only are the values still in the spec file, but the content space can also be processed again and user stories generated without folding or different folding, to see the detail. Folding can include both dimension folding and value folding.

In exemplary embodiments, the content space tool 110 processes command line parameters to determine what kinds of folding are requested. If no fold parameter, the content space tool 110 implements the default setting for folding. As the content space specification files 105 are read, the content space tool 110 collects a list of all fold syms, and values for each. After all the noun spaces are read from input files, the content space tool 110 invokes a fold function. The content space tool implements dimension folding first if requested. For each dimension for which folding is requested, the dimension is folded to "p" in each noun space. If value folding is requested for any dimensions that have not been folded, the following steps are implemented. If noun value folding, the content space tool 110 folds the noun values by removing nouns in value list of a fold sym and replace with single instance of the fold sym. For each (remaining) noun space, for each relevant dimension, the content space tool 110 check each dimension value to see if it is in the value list of a fold sym. If the noun is in the value list of the fold sym, then the content space tool 110 removes the value and adds the fold sym (once only) to the dimension list. If folding has been set off, the content space tool 110 takes no action. The content space by default is loaded in this mode. If fold request for the 'all' or similar, the interface and platform dimensions are folded (as above) and the verb dimension is value-folded for all noun spaces are folded, and the noun dimension is value-folded.

Referring still to FIG. 3, at block 315, each user story is enumerated in the content space and run through filters to classify and possibly add data. At block 320, the user story groups are generated and at block 325 show requests and a summary are generated. At block 330, the requirements are managed and integrated as further described herein.

In exemplary embodiments, a content space is specified in a form that is processed (read) by the content space tool 110 (e.g., an Agile user story generation program). The specification can be split among multiple files (e.g., the content space specification files 105), which can be processed individually or together. As such, an overall product content space can be split among some number of individual architects for parallel concurrent activity, and then processed as a whole.

In exemplary embodiments, each content space specification file 105 includes some number of noun spaces, defined symbols, and filters. A content space specification file 105 is used to define a content space in a form that can be processed programmatically. In exemplary embodiments, the specification file 105 is implemented to generate user stories and provide various kinds of statistics about the content space, enables content coverage metric, automated comparisons of multiple content spaces (e.g. cross-release), and the like. In exemplary embodiments, the content space specification file 105 includes several statements, which define, among other things, a noun space, that can include noun, verb, interface (ifc) and platform. A content space is a set of noun spaces. As such, a basic content space specification file defines one or more noun spaces. Descriptive names are used for the values on all these dimensions. In exemplary embodiments, additional statements can be added to the content space specification file 105. On statement is symbol (SYM) to simplify maintenance of the content space specification file 105 by reducing redundancy across noun space definitions. Another statement is a filter statement that is used to classify user stories, and to add information to output user stories. In exemplary embodiments, each instance of statements as a group, defines a single noun space. For example, the noun statement gives the noun space a name, and the other verb, interface and platform statements provide the values for which each dimension is named.

As further described herein, a sym statement is a simple mechanism to create a short-hand for a list of values. The short-hand can then be used in defining noun spaces (e.g. in 'noun', 'verb', 'ifc', 'platform' statements), in other sym statements, and in filter statements. This implementation of sym statements therefore simplifies use and later changes to the content specification file since the list of related values can reliably changed throughout a set of specification files by changing it in only a single place. For example, assume a content space has 15 noun spaces and 12 of those all use the same platform list. Then that list can defined once as a sym and that sym name used in the 12 noun spaces. The example illustrates a group of related syms that aggregates various example platforms. The sym 'all_email_env' is then used to in the definition of various noun spaces, for example in the 'draft email' noun space.

The symbols that end in a trailing '_' (underbar) are fold syms, as is the 'send_'. The '_' indicates a symbol that can be folded. If the relevant type of value folding is requested (e.g. verb value to fold verb dimension, or platform value to fold platform dimension) then the symbols marked with a trailing '_' are folded. That is, the symbol itself is used in the content space when folded. If not folded the symbol's value list is used in the content space. When folded a symbol is shown in generated user stories with the trailing '_' so that everyone seeing the user story will know it is folded (is an abstraction).

As further described herein, filter statements are used to classify user stories into one of five categories; n/a, future, nochange, changed or new. They also can add to a story a variety of information. A filter statement has the general structure: filter, <expression>, <classification>, <other requests>. The filter expression is a logical expression (i.e., evaluates to True or False) based on the language of the content the content space tool 110. For example, logical operators are supported (i.e., =, !=, >, <, in, not in, etc.) and the variables allowed are 'noun', 'verb', 'ifc', 'platform' and defined symbols (sym's). Other keyword-value pairs which may be included in a filter statement include but are not limited to: 1) Owner, owner name; 2) Group or Groupby request; 3) Priority, priority value; 3) Testid, testid value; and 4) Tag, list of tag values. By default, filtering is done after all the content space specification files 105 have been read and after folding is performed. The content space tool 110 has an option to turn off all filtering which is useful at time to check the results of content space changes.

In exemplary embodiments, the content space specification files 105 can implement additional statements, including, but not limited to: 1) comment_off—used to end commented-out block of lines; 2) comment_on—used to start a block of comment lines. Starts skipping; 3) createdby—used to set the field 'Created By'; 4) csvfile—sets the name of the output .csv file; 5) eof—logically ends file early (rest of file skipped); 6) include—name a file to be included; 7) plannedfor—used to set the RTC field 'Planned For'; 8) scope—used to set filter scope to file (default) or global; 9) set_filterid_in_summary-field—true or false (default); 10) set_implicit_folding—true or false (default); 11) set_summary_prefix—Default is "User Story"; 12) set_summary_suffix—Default is category of the user story; 13) tag_exclusion_set—Define a mutually exclusive set of tags; and 14) title—title (label) of content space.

As described herein, the specification files 105 support the definition of symbols used in the defining the values and in the filters, that is, used within the content space specification file itself. This format helps maintain a content space specification by lessening duplication of constants (i.e., dimension values). This format also serves to help the specification file be self-documenting when description names are used for the symbols. For example, a list of platforms used in a prior release might be assigned to a symbol named 'prior_platforms'. This symbol is then used in the noun spaces as a short-hand for the full list. This symbol can also be used in the filters.

Each use case in a content space is classified using filters into basic categories including, but not limited to: not applicable, future, regression and development. "Not applicable" are use cases judged to likely never be relevant for the product and future are use cases not in the n+1 release but inherent in the content space. In exemplary embodiments, the content space is identified to clearly encompass the requirements to help ensure nothing is missed. In doing so, some use cases are likely to be generated that are not planned for the current release.

In exemplary embodiments, filters are also implemented to add new information to the generated use cases. Examples of information that can be added are priority, tags, references to requirements document and the like.

In exemplary embodiments, filters are also implemented to cause sets of use cases to be grouped into a single, broader output use case. Implementing filters in this manner can be helpful in the case regression use cases where fine-grained management and tracking of the individual use cases is not necessary (e.g., due to the existence of automated testing built during previous releases).

In generating the agile use cases, one or more content space specification files 105 are read by the content space tool 110. As described herein, a primary output is the user story storage medium 115. In exemplary embodiments, the user story storage medium can have a comma separated value (.csv) file format, which is a quasi-standard widely used by many software applications. A second type of output is the additional storage medium 120 for various summary and report like information or in progress changes.

As described herein at block 330 in FIG. 3, the systems and methods described herein manage and integrate the requirements. As also described herein, the points of integration of user story generation with requirements management include but are not limited to: 1. Content Space analysis of requirements, which builds content space definition using requirements for a new release; 2. Navigation, Generation and Review of Content Space per requirement, which provides clarity and cross-team visibility to requirements and builds a common understanding, and content space export; 3. Content space import (of prior release) and export of the total release Content Space, which ensures continuity with past releases, create a basis for the next release, and directly bridge to support the implementation phases for this release; 4. Navigation, review and edit of the content space (total view); and 5. Content space statistics, including by requirement. The points of integration and management are now discussed further.

In exemplary embodiments, the systems and methods described herein perform a content space analysis of requirements. One aspect of the analysis is completeness. A requirement management application (e.g., within the content space tool 110) includes functionality to help ensure that every requirement (for a given release) has been analyzed for impacts to the content space. This functionality includes the following for each requirement to be analyzed: (a) Step the user doing the analysis through each of the content space dimensions; and (b) For each dimension, show existing content space values (i.e., obtained via content space import described herein plus content space analysis done on other requirements). The user may check 0 or more dimension values as impacted with allowance for selecting 'all'. The user can also enter one or more new values. When done with impact analysis for a dimension, the user can click a 'complete' button. Process (b) continues through the noun, verb, interface and platform dimensions. The default impacts for a given dimension can be 0 impacts, which can be indicated by the user clicking 'complete' button without marking any impact.

In exemplary embodiments, the systems and methods described herein enable completeness and made visible by not allowing all four dimensions of the content space to be marked without impacts on any of them. If the dimensions are marked without an impact, a simple error message is shown and the content space analysis for the requirement is kept in 'incomplete' status. This approach has a rationale based in the fact that each requirement must have some content space impact for a release, including nonfunctional requirements (e.g., in areas like scalability, performance, reliability). In another example, every requirement should impact at least one noun. The rationale for every requirement impacting at least one noun is based in the fact that the structure of the content space (logically it a collection of noun spaces) necessitates the impact even if impacts are at lower or more specific levels than a noun, those impacted elements must be in one or more noun spaces.

In exemplary embodiments, the requirements management application of the content space tool 110 saves the content space analysis results in its database, associated with the given requirement (e.g., the additional storage medium 120). The status of the analysis is also persisted so that at any time queries such as the following are possible: 1) Show all the requirements that are unanalyzed; 2) Show the partially analyzed, and 3) Show the completes. For the partially analyzed, when content space impact analysis is resumed, the requirements management application picks up where the analysis was left off.

In exemplary embodiments, the content space impacts that are persisted in the data may separate results by requirement. The content space also supports the aggregation of results across requirements, because regions of the content space frequently have multiple requirements that impact them. The regions of the content space that have multiple requirements that impact them, due to impacting the same dimension elements or other elements which define the same region, for example.

In exemplary embodiments, the requirements management application of the content space tool 110 allows multiple users perform content space analysis for multiple requirements at the same time without loss of data or results integrity. Concurrency may be managed at the requirement level (i.e., one content space analysis at a time) or in the lower level database update mechanism where changes to the content space are persisted. For example, standard atomic update technology may be implemented. If multi-user content space analysis is allowed per requirement, standard refresh techniques can be used to people can see each other's updates to impacted portions of the content space.

In exemplary embodiments, overlap and gaps in user stories are prevented primarily by the structure of the content space itself. When combined with a complete analysis of content space impacts for all the requirements, no gaps and no overlaps occur in the resulting user stories.

Navigation, generation and review of Content Space per requirement are now discussed in further detail. In exemplary embodiments, the systems and methods described herein start with cross requirement summary and comparisons for the content space reviews. The following table (i.e., "view table") illustrates an example in which each row is a requirement:

TABLE 1

| CS: num dimension | CS: num noun | CS: num verb | CS: num platform | CS: num user story | CS: num new user stories | CS: num changed user stories |
|---|---|---|---|---|---|---|
| 0 | 1 | 1 | 1 | 3 | 2 | 1 |
| 0 | 2 | 0 | 0 | 3 | 2 | 1 |
| 0 | 2 | 0 | 0 | 5 | 3 | 2 |
| 0 | 1 | 0 | 0 | 4 | 1 | 3 |
| 0 | 3 | 0 | 0 | 4 | 2 | 2 |
| 0 | 0 | 0 | 0 | 5 | 1 | 4 |
| 0 | 1 | 0 | 0 | 3 | 1 | 2 |
| 0 | 0 | 0 | 0 | 5 | 5 | 0 |
| 0 | 0 | 0 | 0 | 8 | 5 | 3 |
| 0 | 2 | 0 | 0 | 3 | 2 | 1 |

The columns might be items like; ID, requirement summary, development sizing, number of user stories new, number of user stories changes, number of noun spaces impacted, number of new content space elements, number of changed content space elements, total number of impacted user stories and the like. The view table can be generated for all release requirements, or a selectable subset such as only release requirements that have a complete content space analysis. The entire table can be sorted using any column. The various cells in the table are all clickable allowing the user to zoom into lower level detail. When user stories numbers are clicked, the generated user stories are shown with their full attribute list. When content space element numbers are clicked, the full list of content space elements is shown in the context of the non-impacted elements from prior releases with new and changed versions highlighted for the particular set of requirements. For example, the full list of content space elements can be shown on a noun-space basis.

In exemplary embodiments, mechanisms for concurrent group review and approval of the content space are implemented. For example, one person would act as moderator and step through the requirements, showing various views that would be visible via network access to all other people logged into the review. Voice and group chart features can be used to capture comments. Natural ways to organize the review would be by requirement planned for the release, or by noun space. The content space visualization implements GUI features to highlight and visually distinguish parts of the content space that are new, changed and no changed. Changes can be made during the review or off-line. The requirements management application of the content space tool 110 allows comments to be entered for a given requirement to enable asynchronous communication. Formal approvals feature per requirement can be used and requested by stake holders.

In exemplary embodiments, the systems and methods described herein (e.g., via the requirements management application of the content space tool 110) supports the import of a one or more content space specification files 105 or equivalent (e.g., JSON) representations. The representations are used to represent product content from prior releases and the associated user stories. The representations are useful because as new requirements are added the prior release content in the content space tool 110 allows easier identification of content space impacts for a given requirement by presenting prior release nouns, verbs, and the like in the pull down menu. The representations also support the analysis and presentation of data about the overall size of the new release in content space terms, and relative size of the new and changed user stories, and makes visible the impact of the requirements in terms of user stories. As an example, if there are two content spaces, one for the prior and the current release, the systems and methods described herein could compute the new, no change, and deleted stories. The no-change (i.e., the intersection of the two content spaces) would require a look at by the user to confirm that there is no change. It can be appreciated that the content space tool 110 might not prompt for this information on user stories known to be new. In addition, comparing two content space releases may give some feel for churn in the implementation. If the churn rate is coupled with data that shows what user stories in the past had the most field problem, better projections for the software product in questions can be made.

In exemplary embodiments, the systems and methods described herein can export the content space testable units. When requirements definition and planning are ready for commitment, the integrated tools can generate and export all the user stories for import into a development tracking tool such as RTC. The output use cases and/or user stories have the content space-generated data that is currently implemented. For example, the content space-generated data can include, but is not limited to: associated list of requirement identifiers; coordinate values in content space for each use case and user stories; and the RTC fields such as priority, filed against, planned for, owner, description and the like.

Navigation, review and edit of the content space are now discussed in further detail. In exemplary embodiments, the ability to directly edit (e.g., add, change, delete) content space dimension values is implemented via supported UIs (e.g. GUI, browser) In addition, the content space dimension values are associated in a persistent manner with one or more particular requirements. The systems and methods described herein also add tags to portions of the content space, per platform for example, via filters as described herein.

Figure 4:
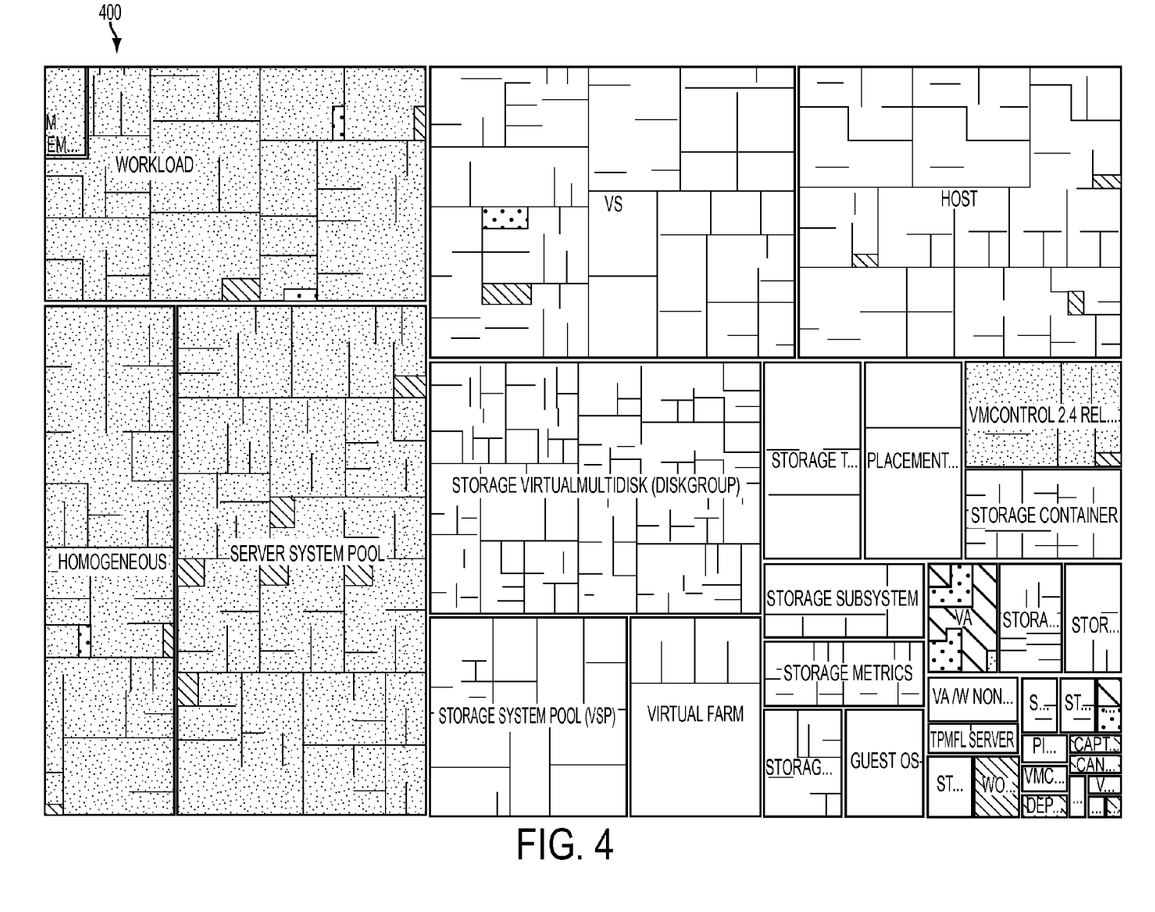
FIG. 4 illustrates an example of a tree map showing content coverage of a content space.

In exemplary embodiments, by generating the user stories for a requirement and including requirement sizing data a tree map visualization can be built for the requirements. FIG. 4 illustrates an example of a tree map 400 showing content coverage of a content space. In exemplary embodiments, the tree map 400 automatically generated and is interactively navigable in the zoom (level of detail) dimension also. Showing the tree map 400 from the requirements management application in the content space tool start with cells representing requirements, then the ability to zoom into nouns, verbs, platforms and interfaces. As a starting point, the top level cell for each requirement would be size proportionally to the number of user stories impacted. In addition, the tree map visualization could use an initial top-level cell size based on other attributes requirements such as development cost sizing, number of teams impacted, or priority. Another approach would be to show priority in cell color or gray scale.

In exemplary embodiments, the systems and methods described herein can respond to a user request to interactively see content space statistics. The content space statistics are selectable and viewable via various user interfaces (GUI, browser, etc.) that the requirements management application of the content space tool 110 supports. Outputs can also be formatted for printing.

The systems and methods described herein can generate statistics per requirements, including one or all requirements. The systems and methods described herein can also generate statistics for the content space for a given release (e.g., selected by 'planned for' value of requirements). Per requirement data can include but is not limited to: 1) Number of user stories; 2) Number of new and changed user stories; 3) Percentages of the all the selected requirements; 4) Requirement rank in size of content space impact (relative to the selected requirements); 5) Computed correlation coefficient of requirement sizing and number of user stories impacted; and 6) Correlation coefficient of sizing and number of teams impacted.

The systems and methods described herein can generate statistics for the total content space. The statistics can include but are not limited to: 1) Total number of user stories; 2) Numbers of n/a, future, no change, changed, new, number of noun space, average size of noun space, average numbers of n/a, future, no change, changed, new; 3) Average number of requirements impacting new and changed user stories; 4) Number of stories with multi requirements; 5) Percentage of stories with multi requirements; 6) Number of nouns with new and changed; 7) Platform splits for major platform groups (number and percentage); 8) Histogram of priority distribution across all user stories (priority is a requirement attribute), and the like.

Figure 5:
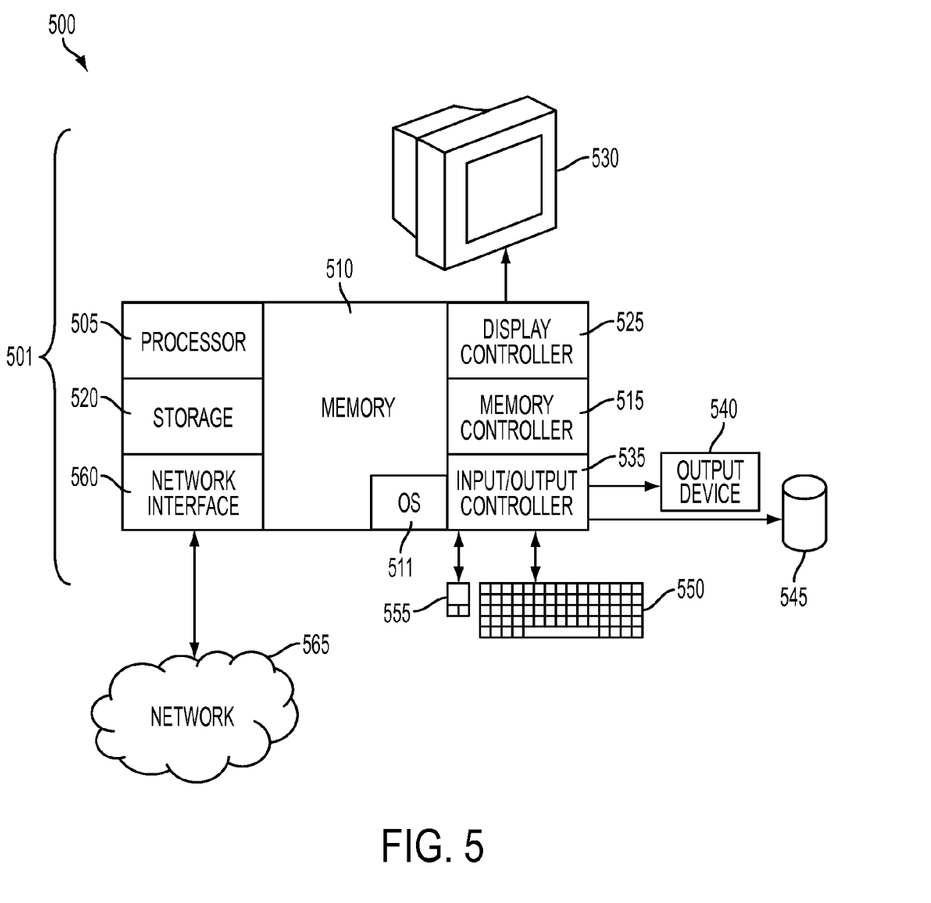
FIG. 5 illustrates an exemplary embodiment of a system in which user stories can be generated and in which requirements can be managed.

The requirements management, user story generation and other content space implementations described herein can be performed in any suitable computing system as now described. FIG. 5 illustrates an exemplary embodiment of a system 500 in which requirements management and user story generation can be implemented. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 500 therefore includes general-purpose computer 501.

In exemplary embodiments, in terms of hardware architecture, as shown in FIG. 5, the computer 501 includes a processor 505, memory 510 coupled to a memory controller 515, and one or more input and/or output (I/O) devices 540, 545 (or peripherals) that are communicatively coupled via a local input/output controller 535. The input/output controller 535 can be, but is not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 505 is a hardware device for executing software, particularly that stored in memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing software instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The software in memory 510 may include one or more separate programs, each of which comprises an ordered listing of executable instructions for implementing logical functions. In the example of FIG. 5, the software in the memory 510 includes the requirements management and user story generation methods described herein in accordance with exemplary embodiments and a suitable operating system (OS) 511. The OS 511 essentially controls the execution of other computer programs, such the requirements management and user story generation systems and methods as described herein, and provides scheduling, input-output control, file and data management, memory management, and communication control and related services.

The requirements management and user story generation methods described herein may be in the form of a source program, executable program (object code), script, or any other entity comprising a set of instructions to be performed. When a source program, then the program needs to be translated via a compiler, assembler, interpreter, or the like, which may or may not be included within the memory 510, so as to operate properly in connection with the OS 511. Furthermore, the requirements management and user story generation methods can be written as an object oriented programming language, which has classes of data and methods, or a procedure programming language, which has routines, subroutines, and/or functions.

In exemplary embodiments, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In exemplary embodiments, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In exemplary embodiments, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the software in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute software stored within the memory 510, to communicate data to and from the memory 510, and to generally control operations of the computer 501 pursuant to the software. The requirements management and user story generation methods described herein and the OS 511, in whole or in part, but typically the latter, are read by the processor 505, perhaps buffered within the processor 505, and then executed.

When the systems and methods described herein are implemented in software, as is shown in FIG. 5, the methods can be stored on any computer readable medium, such as storage 520, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the requirements management and user story generation methods are implemented in hardware, the requirements management and user story generation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include but are not limited to: 1) Improved traceability of requirements; 2) Improved evaluation of requirements feasibility; 3) Improved change management; and 4) Improved test planning and test case generation.

Traceability refers to the cross release tracking and visibility of how implementation activities relate to a given requirement. Some examples basic requirements traceability issues include: designs; code updates; testing planned or done for a given requirement; number of user stories in the release for a given requirement; status of the user stories; test coverage for the requirement's user stories, and the like. The issues are addressed by associating with each user story a list of the requirements that have impact it. The impacting requirements may directly impact one or more of the coordinate values of the user story, or more typically impact a broader region of the content space comprising many user stories. The association or linkage to the requirement is automatically retained or visible from the content space when the content space is used to generate use cases or user stories.

Since the associated use cases or user stories are directly visible in the content space tools described herein, rough estimates of impact and cost are more readily available. In addition, if product history has used content space-generated use cases or user stories in the past, overall estimates of the average cost per use case or use story can be available.

Change management is improved by making the analysis of impacts easier and more reliable. When a change is made there is improved visibility to the changes to requirements as it impacts the content space, through the navigation and review features. In addition, when tools like RTC are used to hold the user stories in the backlog change management efficiency is improved.

Test planning is more efficient by having a complete view of use cases or user stories, and also by being able to separate reliably the new, changed and no change user stories.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for managing user story requirements, the method comprising:
    collecting, by a processor, a plurality of requirements;
    creating, by the processor, a plurality of content space specification files that includes the plurality of requirements;
    processing, by the processor, the plurality of content space specification files to generate a plurality of content space-based testable units;
    defining, by a processor, a content space for representing a portion of the software via a set of dimensions;
    managing, by the processor, the plurality of requirements to reduce gaps and overlap between individual content space testable units in the plurality of content space-based testable units; and
    traversing, by the processor, the content space to generate the plurality of content space-based testable units, wherein the content space includes a plurality of cells, each of the plurality of cells corresponding to one of the plurality of content space-based testable units, each of the plurality of cells having multiple dimensions, each of the multiple dimensions having one or more values, the multiple dimensions including release noun verb interface and platform, wherein the verb, interface and platform dimensions are orthogonal and noun-specific.

2. The method as claimed in claim 1 wherein processing the plurality of content space specification files comprises identifying content space specification statements in each of the plurality of content space specification files.

3. The method as claimed in claim 1 wherein traversing the content space comprises:
    for each of the noun dimensions, for each of the plurality of cells:
        traversing, by the processor, other dimensions of the multiple dimensions of the cell, one value at a time, to generate a content space-based unit corresponding to the cell.

4. The method as claimed in claim 2 further comprising grouping, by the processor, the content space.

5. The method as claimed in claim 2 further comprising folding, by the processor, the content space.

6. A computer program product for managing user story requirements, the computer program product including a non-transitory computer readable medium storing instructions for causing a computer to implement a method, the method comprising:
    collecting, by a processor, a plurality of requirements;
    creating, by the processor, a plurality of content space specification files that includes the plurality of requirements;
    processing, by the processor, the plurality of content space specification files to generate a plurality of content space-based testable units;
    defining, by a processor, a content space for representing a portion of the software via a set of dimensions;
    managing, by the processor, the plurality of requirements to reduce gaps and overlap between individual content space testable units in the plurality of content space-based testable units; and
    traversing the processor, the content space to generate the plurality of content space-based testable units, wherein the content space includes a plurality of cells, each of the plurality of cells corresponding to one of the plurality of content space-based testable units, each of the plurality of cells having multiple dimensions, each of the multiple dimensions having one or more values, the multiple dimensions including release, noun, verb, interface, and platform, wherein the verb, interface and platform dimensions are orthogonal and noun-specific.

7. The computer program product as claimed in claim 6 wherein processing the plurality of content space specification files comprises identifying content space specification statements in each of the plurality of content space specification files.

8. The computer program product as claimed in claim 7 wherein traversing the content space comprises
    for each of the noun dimensions, for each of the plurality of cells:
        traversing, by the processor, other dimensions of the multiple dimensions of the cell, one value at a time, to a content space-based testable unit corresponding to the cell.

9. The computer program product as claimed in claim 7, wherein the method further comprises grouping the content space.

10. The computer program product as claimed in claim 7, wherein the method further comprises folding the content space.

11. A system for managing user story requirements, the system comprising:
- a processor configured to:
- collect a plurality of requirements;
- create a plurality of content space specification files that includes the plurality of requirements;
- process the plurality of content space specification files to generate the plurality of content space-based testable units;
- define a content space for representing a portion of the software via a set of dimensions;
- manage the plurality of requirements to reduce gaps and overlap between individual content space testable units in the plurality of content space-based testable units; and
- traversing, by the processor, the content space to generate the plurality of content space-based testable units, wherein the content space includes a plurality of cells, each of the plurality of cells corresponding to one of the plurality of content space-based testable units, each of the plurality of cells having multiple dimensions, each of the multiple dimensions having one or more values, the multiple dimensions including release, noun, verb, interface, and platform, wherein the verb, interface and platform dimensions are orthogonal and noun-specific.

* * * * *